US008469797B2

(12) United States Patent
Collette et al.

(10) Patent No.: US 8,469,797 B2
(45) Date of Patent: Jun. 25, 2013

(54) WAGERING GAME WITH MULTIPLE OVERLYING REEL STRIPS FOR TRIGGERING EVENTS OR OUTCOMES

(75) Inventors: Shawn C. Collette, Henderson, NV (US); Brad Schultz, Las Vegas, NV (US); Joel R. Jaffe, Glenview, IL (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/245,135

(22) Filed: Sep. 26, 2011

(65) Prior Publication Data

US 2012/0077564 A1 Mar. 29, 2012

Related U.S. Application Data

(60) Provisional application No. 61/386,623, filed on Sep. 27, 2010.

(51) Int. Cl.
*G06F 17/00* (2006.01)

(52) U.S. Cl.
USPC .......... 463/20

(58) Field of Classification Search
USPC .......... 463/16–25, 29
See application file for complete search history.

(56) References Cited

U.S. PATENT DOCUMENTS

| | | | |
|---|---|---|---|
| 4,648,600 | A | 3/1987 | Olliges |
| 5,833,537 | A | 11/1998 | Barrie |
| 5,967,896 | A | 10/1999 | Jorasch et al. |
| 6,056,642 | A | 5/2000 | Bennett |
| 6,089,977 | A | 7/2000 | Bennett |
| 6,093,102 | A | 7/2000 | Bennett |
| 6,117,009 | A | 9/2000 | Yoseloff |
| 6,190,254 | B1 | 2/2001 | Bennett |
| 6,251,013 | B1 | 6/2001 | Bennett |
| 6,270,411 | B1 | 8/2001 | Gura et al. |
| 6,280,328 | B1 | 8/2001 | Holch et al. |
| 6,290,600 | B1 | 9/2001 | Glasson |
| 6,311,976 | B1 | 11/2001 | Yoseloff et al. |
| 6,439,993 | B1 | 8/2002 | O'Halloran |
| 6,517,432 | B1 | 2/2003 | Jaffe |
| 6,517,433 | B2 | 2/2003 | Loose et al. |
| 6,551,187 | B1 | 4/2003 | Jaffe |
| 6,565,433 | B1 | 5/2003 | Baerlocher et al. |
| 6,604,740 | B1 | 8/2003 | Singer et al. |
| 6,638,169 | B2 | 10/2003 | Wilder et al. |
| 6,648,758 | B2 | 11/2003 | Bennett et al. |

(Continued)

FOREIGN PATENT DOCUMENTS

| | | |
|---|---|---|
| EP | 1150261 | 10/2001 |
| GB | 2092797 | 8/1982 |

(Continued)

*Primary Examiner* — Ronald Laneau
(74) *Attorney, Agent, or Firm* — Nixon Peabody LLP

(57) ABSTRACT

A method for enabling a portal game on a wagering game device includes the acts of using a processor operatively associated with the wagering game device to conducting a wagering game on the wagering game device in accord with a first math model and using a portal game controller, which may be the processor operatively associated with the wagering game device or a separate controller, operatively associated with both the portal game and the wagering game device, to overlay a portal game over the wagering game. The portal game includes a second math model that is mathematically independent from the first math model of the wagering game.

20 Claims, 8 Drawing Sheets

U.S. PATENT DOCUMENTS

| | | | | |
|---|---|---|---|---|
| 6,731,313 | B1 | 5/2004 | Kaminkow | |
| 6,780,109 | B2 | 8/2004 | Kaminkow | |
| 6,805,349 | B2 | 10/2004 | Baerlocher et al. | |
| 6,805,632 | B2 | 10/2004 | Suda | |
| 6,805,633 | B2 | 10/2004 | Hein, Jr. et al. | |
| 6,837,790 | B1 | 1/2005 | Kaminkow | |
| 6,843,725 | B2 | 1/2005 | Nelson | |
| 6,848,996 | B2 | 2/2005 | Hecht et al. | |
| 6,866,583 | B2 | 3/2005 | Glavich et al. | |
| 6,893,342 | B1 | 5/2005 | Singer et al. | |
| 6,905,406 | B2 | 6/2005 | Kaminkow et al. | |
| 6,918,832 | B2 | 7/2005 | Baerlocher et al. | |
| 6,921,335 | B2 | 7/2005 | Rodgers et al. | |
| 6,935,947 | B1 | 8/2005 | Singer et al. | |
| 6,939,228 | B2 | 9/2005 | Shimizu | |
| 6,968,063 | B2 | 11/2005 | Boyd | |
| 6,981,635 | B1 | 1/2006 | Hughs-Baird et al. | |
| 7,195,559 | B2 | 3/2007 | Gilmore et al. | |
| 7,311,601 | B2 * | 12/2007 | Anderson et al. | 463/20 |
| 7,704,141 | B1 | 4/2010 | Marks et al. | 463/20 |
| 2002/0025846 | A1 | 2/2002 | Bennett et al. | |
| 2002/0025849 | A1 | 2/2002 | Olive | |
| 2002/0039918 | A1 | 4/2002 | Anderson et al. | |
| 2002/0047238 | A1 | 4/2002 | Ainsworth et al. | |
| 2002/0052233 | A1 | 5/2002 | Gauselmann | |
| 2002/0082075 | A1 | 6/2002 | Meyer | |
| 2003/0013517 | A1 | 1/2003 | Bennett et al. | |
| 2003/0045354 | A1 | 3/2003 | Giobbi | |
| 2003/0054874 | A1 | 3/2003 | Kaminkow | |
| 2003/0057645 | A1 | 3/2003 | Baerlocher et al. | |
| 2003/0060267 | A1 | 3/2003 | Glavich et al. | |
| 2003/0064779 | A1 | 4/2003 | Suda | |
| 2003/0064802 | A1 | 4/2003 | Rodgers et al. | |
| 2003/0069062 | A1 | 4/2003 | Shimizu | |
| 2003/0073490 | A1 | 4/2003 | Hecht et al. | |
| 2003/0073491 | A1 | 4/2003 | Hecht et al. | |
| 2003/0100359 | A1 | 5/2003 | Loose et al. | |
| 2003/0186737 | A1 | 10/2003 | Bennett et al. | |
| 2003/0203752 | A1 | 10/2003 | Kaminkow et al. | |
| 2003/0203753 | A1 | 10/2003 | Muir et al. | |
| 2003/0207709 | A1 | 11/2003 | Paotrakul | |
| 2003/0211881 | A1 | 11/2003 | Walker et al. | |
| 2004/0038730 | A1 | 2/2004 | Suda | |
| 2004/0048646 | A1 | 3/2004 | Visocnik | |
| 2004/0048652 | A1 | 3/2004 | Ching et al. | |
| 2004/0053676 | A1 | 3/2004 | Rodgers | |
| 2004/0053695 | A1 | 3/2004 | Mattice et al. | |
| 2004/0072612 | A1 | 4/2004 | Rodgers et al. | |
| 2004/0082388 | A1 | 4/2004 | Simsek et al. | |
| 2004/0097280 | A1 | 5/2004 | Gauselmann | |
| 2004/0137982 | A1 | 7/2004 | Cuddy et al. | |
| 2004/0138889 | A1 | 7/2004 | Gilboy et al. | |
| 2004/0147316 | A1 | 7/2004 | Nagano | |
| 2004/0229679 | A1 | 11/2004 | Anderson et al. | |
| 2005/0020344 | A1 | 1/2005 | Kaminkow | |
| 2005/0049030 | A1 | 3/2005 | Tachikawa | |
| 2005/0049035 | A1 | 3/2005 | Baerlocher et al. | |
| 2005/0054412 | A1 | 3/2005 | Gauselmann | |
| 2005/0064924 | A1 | 3/2005 | Glavich et al. | |
| 2005/0101369 | A1 | 5/2005 | Meyer | |
| 2005/0101380 | A1 | 5/2005 | Glavich et al. | |
| 2005/0148384 | A1 | 7/2005 | Marks et al. | |
| 2005/0164775 | A1 | 7/2005 | Rodgers et al. | |
| 2005/0282607 | A1 | 12/2005 | Gauselmann | |
| 2006/0058097 | A1 | 3/2006 | Berman et al. | |
| 2006/0068873 | A1 | 3/2006 | Gomez | 463/16 |
| 2007/0087806 | A1 * | 4/2007 | Luciano et al. | 463/16 |
| 2007/0087807 | A1 * | 4/2007 | Luciano et al. | 463/16 |
| 2007/0087808 | A1 * | 4/2007 | Luciano et al. | 463/16 |
| 2008/0004100 | A1 | 1/2008 | Hein et al. | |
| 2008/0139305 | A1 * | 6/2008 | Vallejo et al. | 463/27 |
| 2009/0005145 | A1 | 1/2009 | White | |
| 2010/0004056 | A1 | 1/2010 | Walker et al. | |
| 2010/0029369 | A1 | 2/2010 | Pacey | 463/20 |

FOREIGN PATENT DOCUMENTS

| | | |
|---|---|---|
| GB | 2096376 | 10/1982 |
| GB | 2097160 | 10/1982 |
| GB | 2119991 | 11/1983 |
| GB | 2137392 | 10/1984 |
| WO | 2007/089410 | 8/2007 |
| WO | 2008/063408 | 5/2008 |
| WO | WO2009/011832 A2 | 1/2009 |
| WO | WO2009/061479 A1 | 5/2009 |

* cited by examiner

WAGERING GAME WITH MULTIPLE OVERLYING REEL STRIPS FOR TRIGGERING EVENTS OR OUTCOMES

REFERENCE TO RELATED APPLICATIONS

This application is related to and claims priority to U.S. Provisional Patent Application Ser. No. 61/386,623, filed Sep. 27, 2010, and titled "Wagering Game with Multiple Overlying Reel Strips For Triggering Events or Outcomes," which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering game methods and related wagering game apparatuses and systems.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

When conducting a wagering game, a player receives an individual award if a winning outcome is achieved. For example, in a traditional reel-based wagering game, a winning outcome is achieved if a particular, predetermined combination of symbols occurs on the reels along an active pay line upon which a player has lodged a wager. The award corresponding to that predetermined combination of symbols and often the level of the wager itself along the associated active pay line is then awarded to the player.

SUMMARY OF THE INVENTION

According to one aspect of the present invention, a method for enabling a portal game on a wagering game device includes the acts of using a processor operatively associated with the wagering game device to conducting a wagering game on the wagering game device in accord with a first math model and using a portal game controller, which may be the processor operatively associated with the wagering game device or a separate controller, operatively associated with both the portal game and the wagering game device, to overlay a portal game over the wagering game. The portal game includes a second math model that is mathematically independent from the first math model of the wagering game.

According to another aspect of the invention, a method for enabling a portal game across a plurality of wagering game devices conducting a plurality of wagering games, at least some of the plurality of wagering games having different math models. The method includes the acts of using one or more processors operatively associated with the wagering game devices, conducting a first wagering game on a first wagering game device in accord with a first math model and conducting a second wagering game on a second wagering game device in accord with a second math model. The method also includes using a portal game controller, which may be the one or more processors operatively associated with the wagering game devices or a separate controller, operatively associated with both the portal game and the first and second wagering game devices, overlaying a portal game over each of the first wagering game and the second wagering game, the portal game comprising a third math model that is mathematically independent from the first math model and the second math model.

According to yet another aspect of the invention, a computer readable storage media is encoded with instructions for directing a gaming system to perform the above methods.

In yet other aspects, a wagering game system configured to independently and simultaneously conduct a wagering game and a portal game on at least one wagering game device includes at least one wagering game device comprising a display device and at least one controller in communication with the display device, the at least one controller being operative to execute instructions borne by a physical storage medium, the instructions causing the at least one controller to perform the acts of conducting a wagering game on the wagering game device in accord with a first math model, overlaying a portal game over the wagering game, the portal game comprising a second math model that is mathematically independent from the first math model of the wagering game, and determining an outcome for the wagering game and the portal game, the outcome being simultaneously displayed on the display device.

Additional aspects of the invention will be apparent to those of ordinary skill in the art in view of the detailed description of various embodiments, which is made with reference to the drawings, a brief description of which is provided below.

Figure 1:
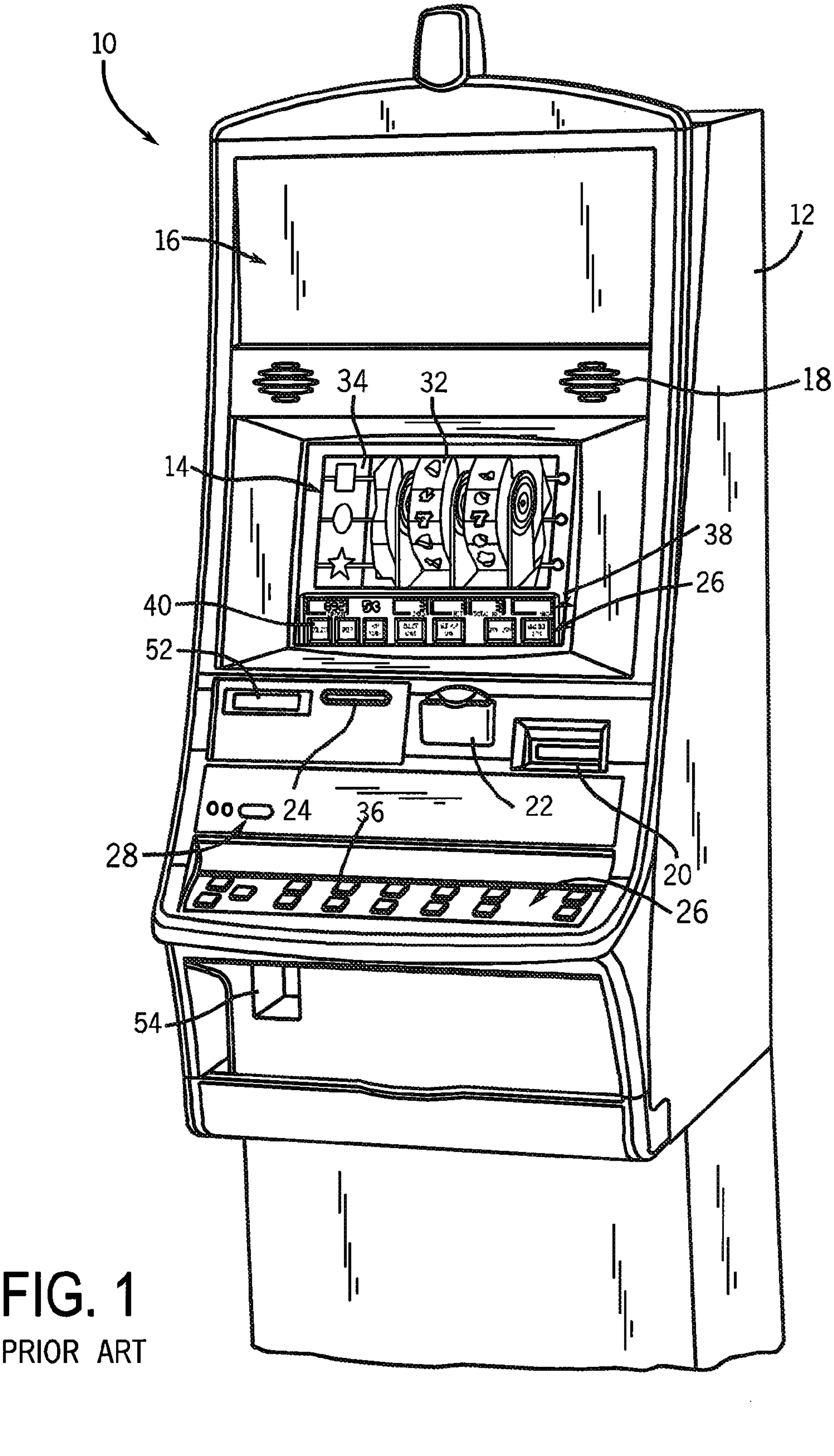
FIG. 1 PRIOR ART
FIG. 1 is a perspective view of a free-standing gaming terminal according to an embodiment of the present invention.

While the present concepts are susceptible to various modifications and alternative forms, specific embodiments have been shown by way of example in the drawings and will be described in detail herein. It should be understood, however, that the present concepts are not intended to be limited to the particular forms disclosed. Rather, the present concepts are to cover all modifications, equivalents, and alternatives falling within the spirit and scope of the present concepts such as, but not limited to, those concepts defined by the appended claims.

DETAILED DESCRIPTION

While the present concepts is susceptible of embodiment in many different forms, there is shown in the drawings and will herein be described in detail preferred embodiments of the present concepts with the understanding that the present disclosure is to be considered as an exemplification of the principles of the present concepts and is not intended to limit the broad aspect of the present concepts to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
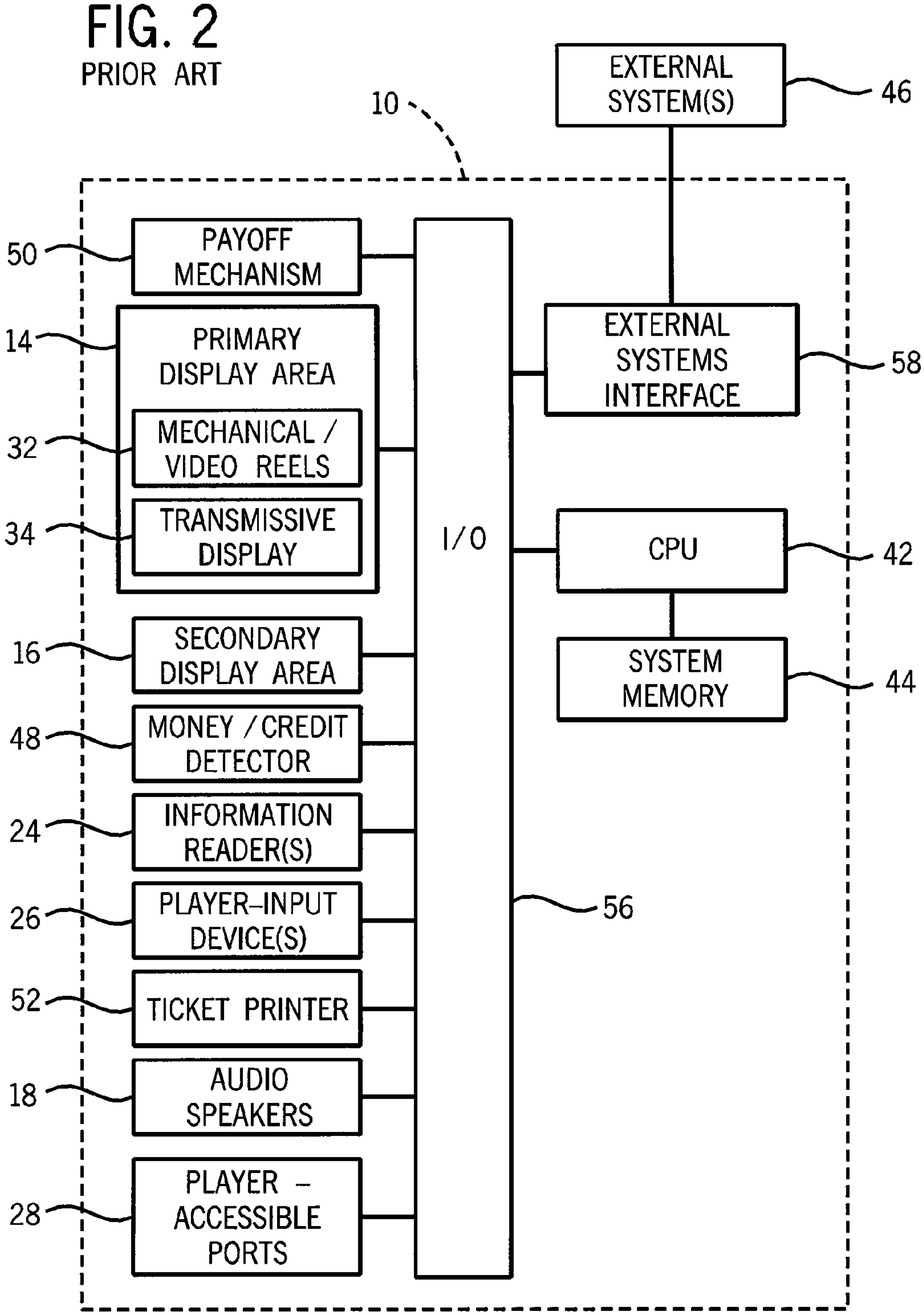
FIG. 2 PRIOR ART
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
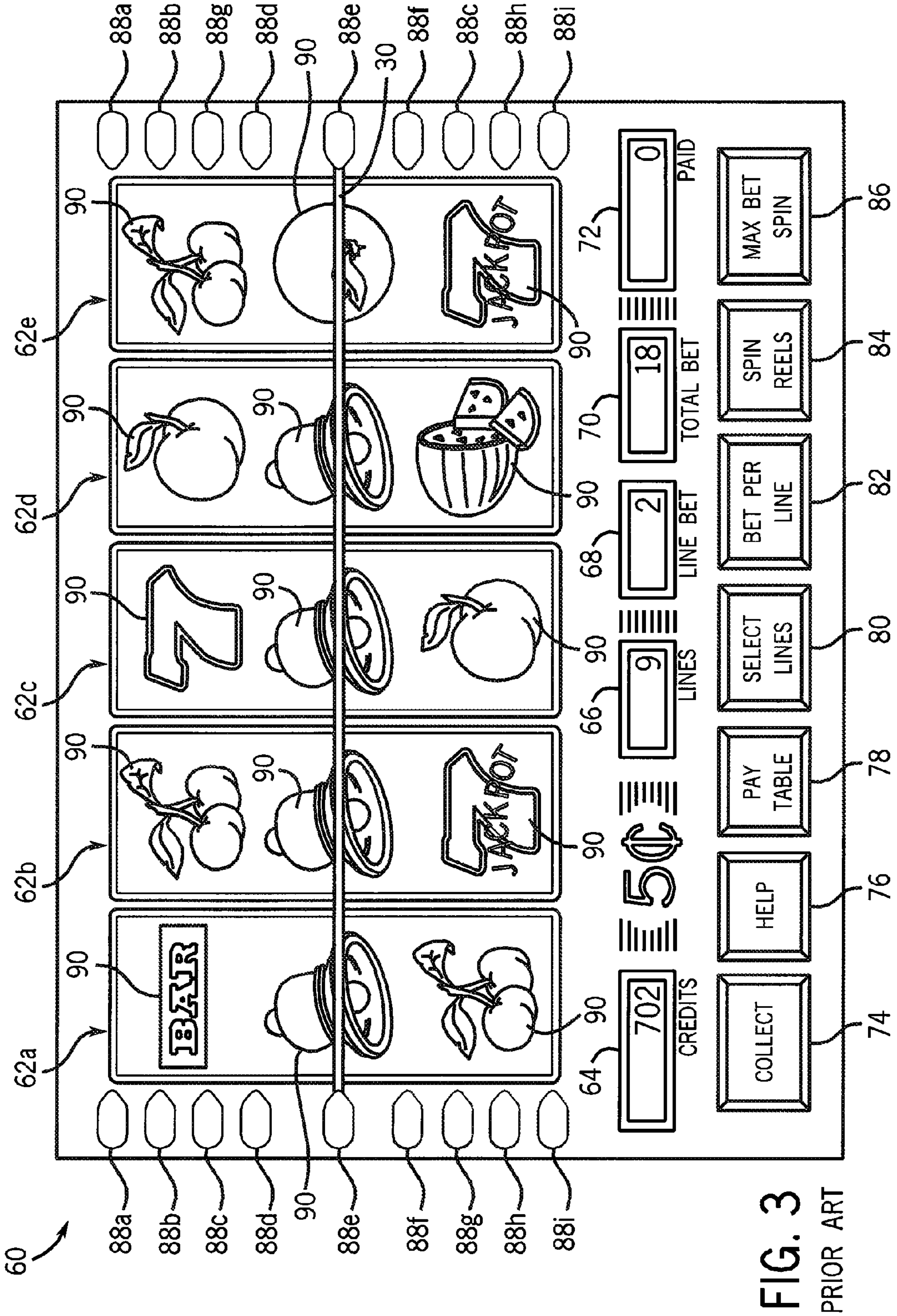
FIG. 3 PRIOR ART
FIG. 3 is an image of an example of a wagering game screen adapted to be displayed on a display of a wagering game machine.

Referring now to FIG. 3, an image of a basic-game screen 60 adapted to be displayed on the primary display area 14 is illustrated, according to one embodiment of the present concepts. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc. The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a*-62*e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Wagering games are regulated in accord with the laws of the various jurisdictions that permit gambling. The Nevada Gaming Control Act (chapters 463, 463A, 463B, 464 and 465 of the Nevada Revised Statutes) sets forth, by way of example, various general requirements for the obtaining of a license of approved gaming devices and systems. Section 14.040 of the Act sets forth minimum standards for gaming devices submitted for approval and states that the gaming devices "[m]ust theoretically pay out a mathematically demonstrable percentage of all amounts wagered, which must not be less than 75 percent for each wager available for play on the device" and that the gaming devices "[m]ust use a random selection process to determine the game outcome of each play of a game" and that "[t]he random selection process must meet 95 percent confidence limits using a standard chi-squared test for goodness of fit." Moreover, subsection 2(a) thereof states that "[e]ach possible permutation or combination of game elements which produce winning or losing game outcomes must be available for random selection at the initiation of each play". Section 14.030 of the Act states also that gaming device approval requires the gaming device designer to provide "[i]nformation sufficient to calculate a theoretical payoff schedule amount including, but not limited to, the base and reset amounts, the total contribution percentage and a breakdown of that percentage including contribution rates to all progressive payoff schedules and all reset funds, the odds of winning the progressive payoff schedule and the amount of the wager required to win the progressive payoff schedule." In other words, the "math" of the game, inclusive of the base wagering game and bonus game or games, must be reviewed and analyzed, as a whole, by the Nevada Gaming Commission.

In accord with the concepts presented herein, the present concepts broadly include any wagering game (i.e., a second wagering game) that is superimposed over another wagering game (i.e., a first wagering game), wherein the two wagering games are mathematically independent or, alternatively, any portal trigger that is superimposed over a wagering game, wherein the portal trigger and the wagering game are mathematically independent. The portal trigger is, in at least some aspects, a pay-for portal trigger that requires coin-in or wagered funds dedicated to the portal trigger or portal game either prior to the play of the wagering game in which the portal trigger outcome(s) are overlaid or subsequent to a triggering of the portal game and prior to such portal game (e.g., the portal game or application may itself have coin-in requirements that factor into the portal expected value or payback percentage). The "payback percentage" refers to one or more numbers which signify a theoretical mathematical value associated with a gaming device or system indicating a theoretical percentage or proportion of wagers which will be either returned to players via awards or retained by an operator of the gaming device or system. One example of a payback percentage is referred to as a "payout percentage," a theoretical average percentage of all wagers input into a gaming device or system which are returned or dispensed to players in the form of awards.

The second or overlaid wagering game noted above, or portal game corresponding to the portal trigger, can comprise any type of wagering game such as, but not limited to, a progressive game, a picking game, or a reel-based game, community game (e.g., a "Big Event" type-game manufactured by WMS Gaming Inc. of Waukegan, Ill., etc.), which has a math model independent from that of the first wagering game (and any bonus game or game features corresponding thereto). Such math model may include any math model that is different from that of the wagering game over which the second wagering game or portal trigger is overlaid. By way of example, a first wagering game utilizes a first math model leading to a first payback percentage and the second wagering game or portal trigger, as noted above, utilizes a second math model leading to a second payback percentage or even the first payback percentage (i.e., the payback percentage itself is but one aspect of a math model).

A math model is used herein to define the underlying mathematical relationships and schemes for a particular wagering game. The math model of a wagering game includes, determines, and is impacted by, for example, the hit frequency for the game, the variability of the game, the payback percentage of the game, and the volatility of the game. In short, math model, as used herein, describes generally what can occur during a wagering game and how often it will (or likely it is to) occur.

Figure 4A:
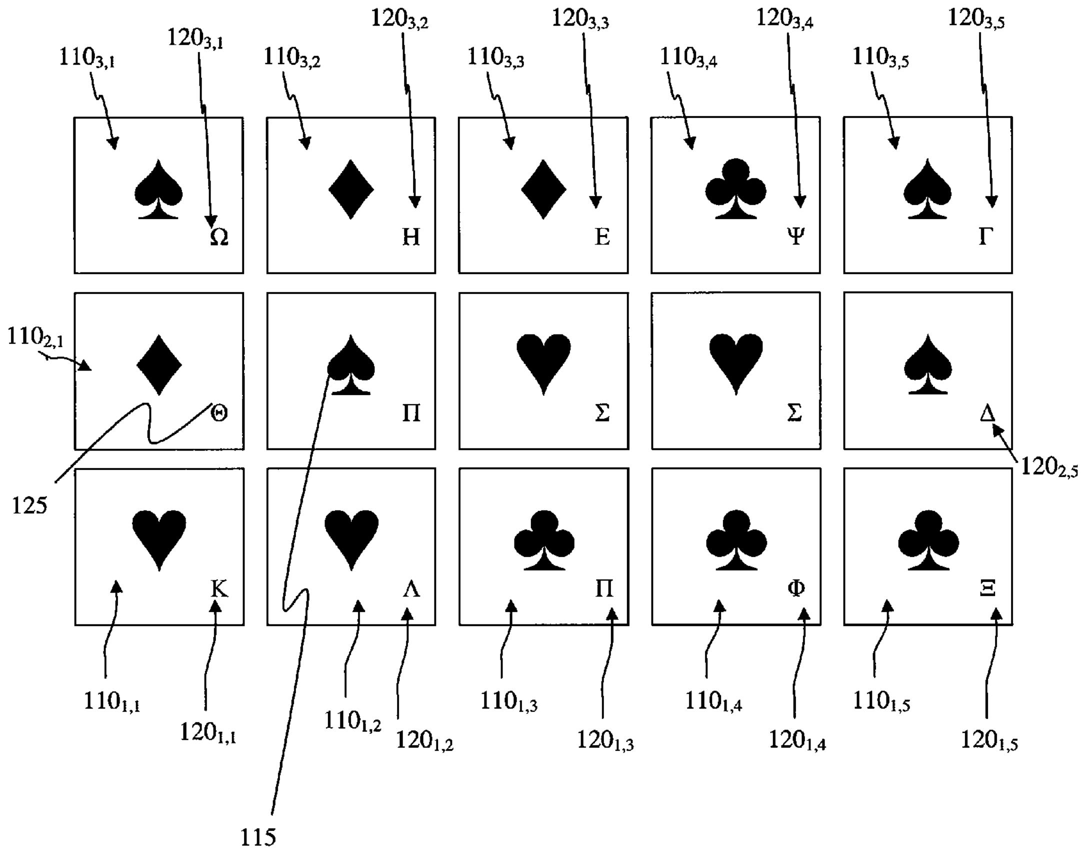
FIGS. 4*a*-4*b* are depictions of examples of at least some aspects of an embodiment according to the present concepts.
Figure 4B:
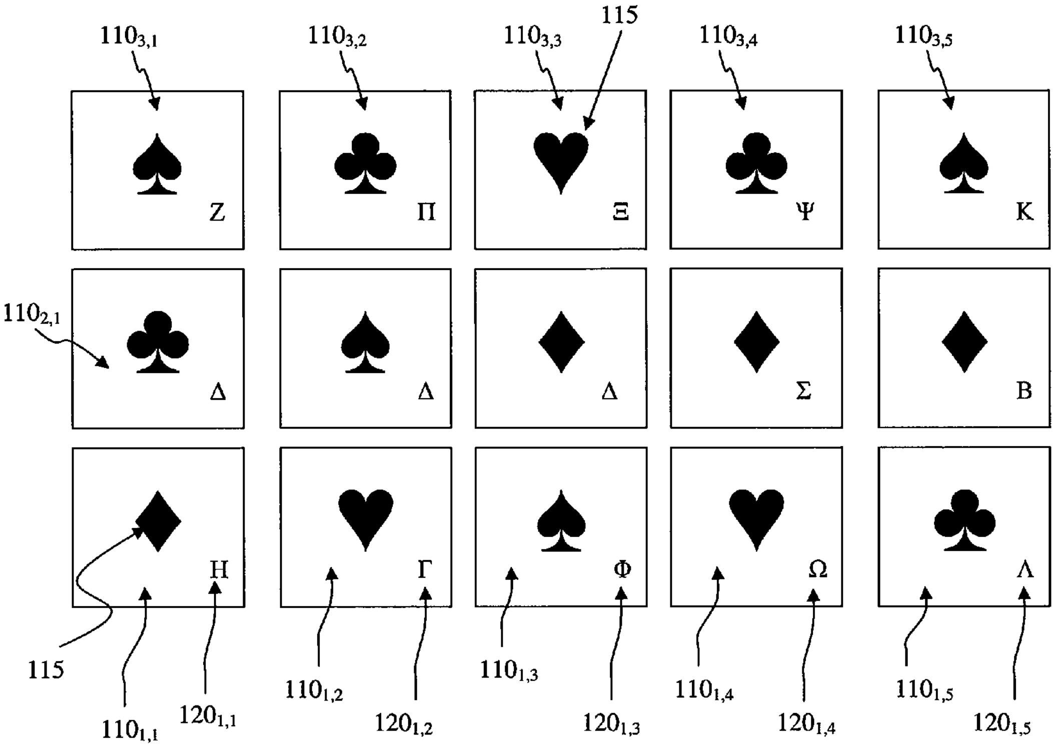

FIGS. 4*a*-4*b* show an example of a slot-type wagering game in accord with some aspects of the present concepts in which a portal game trigger is overlaid over a base game. Specifically, in the depicted 3×5 array of symbol positions $\mathbf{110}_{x,y}$ (where x and y represent any integer) representing a five-column, three row wagering game, a variety of wagering game symbols 115 comprising playing card suits (Spade, Heart, Diamond, Club) are shown. The symbols 115 are associated with the base wagering game and predetermined combinations of the symbols are correlated to a variety of winning outcomes set forth in the pay table of the wagering game. Predetermined symbols or symbol combinations in the base wagering game, as noted above, can trigger a bonus game, game feature, progressive game, or the like.

FIGS. 4*a*-4*b* also show a separate array of portal symbols 125 within symbol positions 120*x,y*, the portal symbols being represented as Greek capital letters. These symbols 115, 125 are merely for purposes of illustration and are not intended to limit the concepts disclosed herein in any manner. The portal symbols 125 may be displayed on the same display as the wagering game symbols 115 or on a separate display, such as a transmissive video display disposed in front of the mechanical-reel display or a transmissive video display disposed in front of another video display. As used herein, the term portal symbol refers generally to any visual indicator used to display to a player the potential eligibility of the player for entry into a portal game including, but not limited to, any symbol(s) or sub-symbol(s), watermark(s), and/or light(s) or backlighting, or combinations thereof.

FIG. 4*a* shows a first array of symbol positions, starting with the bottom left symbol position $\mathbf{110}_{1,1}$, which depicts a heart symbol 115. Symbol position $\mathbf{110}_{1,2}$ depicts a heart symbol 115. Symbol position $\mathbf{110}_{1,3}$ depicts a club symbol 115. Symbol position $\mathbf{110}_{1,4}$ depicts a club symbol 115. Symbol position $\mathbf{110}_{1,5}$ depicts a club symbol 115. On the middle row, symbol position $\mathbf{110}_{2,1}$ depicts a diamond symbol 115. Symbol position $\mathbf{110}_{2,2}$ depicts a diamond symbol 115. Symbol position $\mathbf{110}_{2,3}$ depicts a spade symbol 115. Symbol position $\mathbf{110}_{2,4}$ depicts a heart symbol 115. Symbol position $\mathbf{110}_{2,5}$ depicts a heart symbol 115. On the top row, symbol position $\mathbf{110}_{3,1}$ depicts a spade symbol 115. Symbol position $\mathbf{110}_{3,2}$ depicts a diamond symbol 120. Symbol position $\mathbf{110}_{3,3}$ depicts a diamond symbol 115. Symbol position $\mathbf{110}_{3,4}$ depicts a spade symbol 115. Symbol position $\mathbf{110}_{3,5}$ depicts a spade symbol 115.

FIG. 4*a* also shows a second array of symbol positions $\mathbf{120}_{x,y}$, starting with the bottom left symbol position $\mathbf{120}_{1,1}$, which depicts a "Kappa" portal symbol 125. Symbol position $\mathbf{120}_{1,2}$ depicts a "Lamda" portal symbol 125. Symbol position $\mathbf{120}_{1,3}$ depicts a "Pi" portal symbol 125. Symbol position $\mathbf{120}_{1,4}$ depicts a "Phi" portal symbol 125. Symbol position $\mathbf{120}_{1,5}$ depicts a "Xi" portal symbol 125. On the middle row, symbol position $\mathbf{120}_{2,1}$ depicts a "Theta" portal symbol 125. Symbol position $\mathbf{120}_{2,2}$ depicts an "Omega" portal symbol 125. Symbol position $\mathbf{120}_{2,3}$ depicts a "Pi" portal symbol 125. Symbol position $\mathbf{120}_{2,4}$ depicts a "Sigma" portal symbol 125. Symbol position $\mathbf{120}_{2,5}$ depicts a "Delta" portal symbol 125. On the top row, symbol position $\mathbf{120}_{3,1}$ depicts an "Omega" portal symbol 125. Symbol position $\mathbf{120}_{3,2}$ depicts an "Eta" portal symbol 125. Symbol position $\mathbf{120}_{3,3}$ depicts an "Epsilon" portal symbol 125. Symbol position $\mathbf{120}_{3,4}$ depicts a "Psi" portal symbol 125. Symbol position $\mathbf{120}_{3,5}$ depicts a "Gamma" portal symbol 125.

Similarly, FIG. 4*b* shows another arrangement of a randomly determined first array of symbols 115 in symbol positions $\mathbf{110}_{x,y}$ and a mathematically independent second array of portal symbols 125 in symbol positions $\mathbf{120}_{x,y}$.

In accord with the present concepts, the first array of symbols 115 shown in symbol positions $\mathbf{110}_{x,y}$ is mathematically independent from the second array of portal symbols 125 shown in symbol positions $\mathbf{120}_{x,y}$ and the second array of symbols, or the like, is not functionally related to the base wagering game. Instead, the second array of portal symbols shown in symbol positions $\mathbf{120}_{x,y}$, or the like, is utilized to trigger a portal bonus game or other portal game that is not mathematically related to the underlying base wagering game. Due to this mathematical independence of the second array of portal symbols 125 from the first array of symbols 115, the second array of portal symbols is not influenced by the base wagering game, the size or number of reel strips in the base wagering game, the volatility of the base wagering game, or the math model of the base wagering game. It should be noted that, although the illustrated embodiment may appear to have the second array of portal symbols being associated with a particular reel position, no such association is, in fact, present. The first array of symbols 115 and the second array of portal symbols 125 are completely independent from one another. Thus, the portal symbol 125 displayed adjacent to each primary symbol 115 may, and often does, fluctuate and differ from spin to spin.

Figure 5:
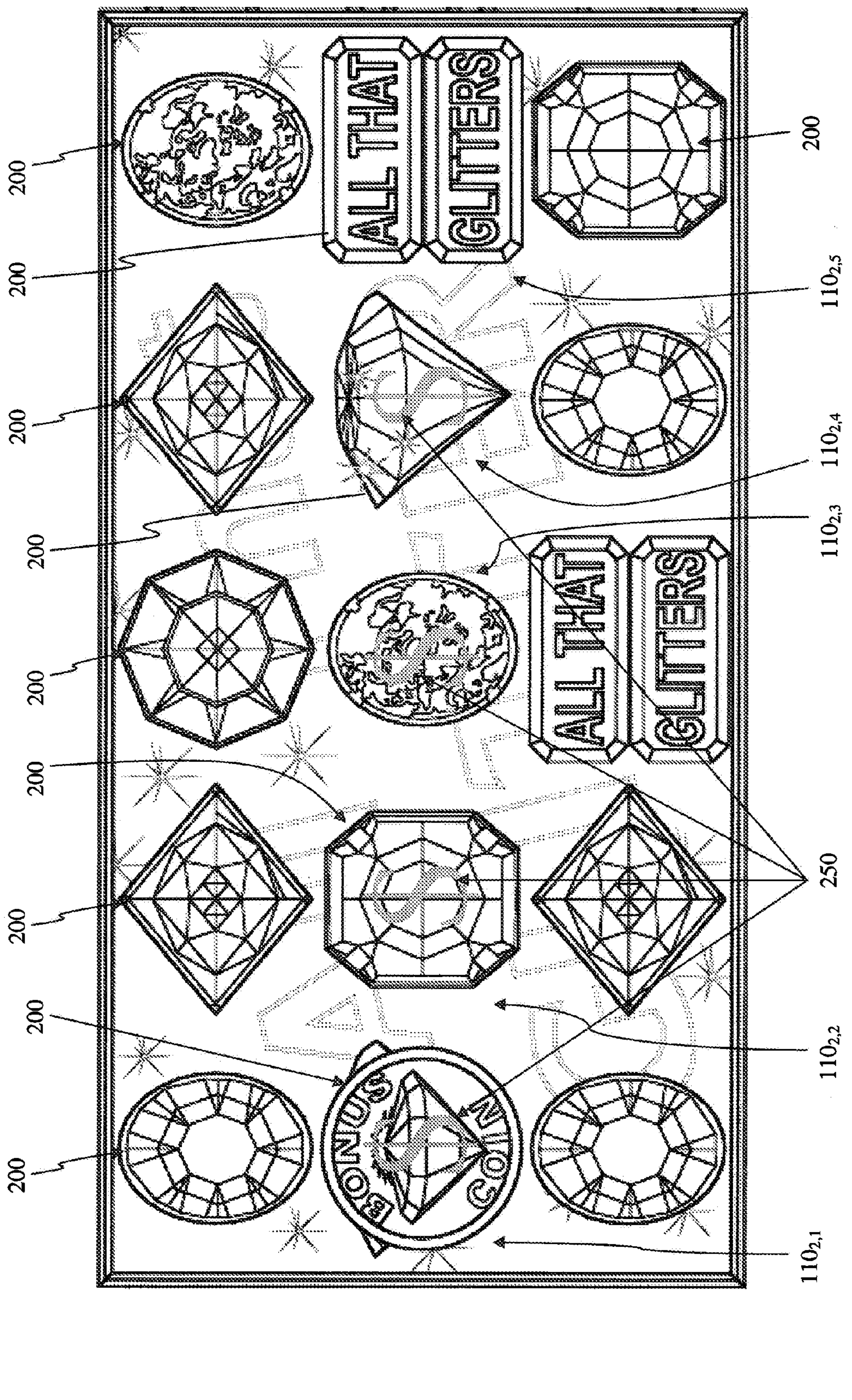
FIG. 5 is a depictions of an example of at least one aspect of another embodiment according to the present concepts.

Although the example depicted in FIGS. 4*a*-4*b* depict a second array of symbols 125 shown in symbol positions $\mathbf{120}_{x,y}$ and the second array of symbols, the trigger for the portal bonus game may comprise other arrangements such as, but not limited to, watermarks overlaid over the base wagering game reels or symbol positions, wherein the watermarks are not functionally related to the base wagering game and are mathematically independent thereof. By way of example, FIG. 5 shows a simulated screen display for a WMS Gaming Inc. wagering game titled "ALL THAT GLITTERS"®, wherein watermarks, dollar signs in this example, are superimposed over (or behind) the normal reel symbols that are displayed to the player in association with the wager. The symbols 200 illustrated correspond to a math model of the "ALL THAT GLITTERS"® wagering game, whereas the watermarks 250 are independent of the math model of the "ALL THAT GLITTERS"® wagering game and are instead associated with a different math model. In FIG. 5, the watermarks 250 are shown to occur along a conventionally activated payline in the base wagering game encompassing the middle row or symbol positions $\mathbf{110}_{2,1}$ through $\mathbf{110}_{2,5}$. These purely exemplary simulated watermarks 250 are merely intended to illustrate one manner in which the portal entry requirements for a portal game may be presented to a player (e.g., as a watermark displayed in association with one or more symbol position(s)) and are in no way to be interpreted as limiting this overall context. In accord with the present concepts, a watermark, where employed, may be displayed over, behind, and/or adjacent a symbol displayed in the corresponding symbol position. In accord with the present concepts, the watermark 250 does not travel with a particular primary symbol 200 from spin to spin, but rather moves independently from the primary symbol 200 based on the independent math model for the watermark 250.

In another example, the depicted wagering game symbols 115 and portal symbols 125 represent symbols shown in FIGS. 4*a*-4*b* may be viewed as symbols presented in a bonus game, such as in a free spin bonus. In such a configuration, the portal symbols 125 may trigger the portal bonus game from a bonus game, rather than from a base wagering game. Thus, by way of example, the symbols shown in FIG. 4*a* could represent a first spin in a free-spin bonus game and FIG. 4*b* could represent a second spin in a free-spin bonus game. Alternate rules may also optionally apply in such bonus games. For example, in accord with the present concepts, in a bonus game comprising spinning reels, a re-spin of a specific reel or reel position in a bonus game may not cause a retriggering of a portal symbol or watermark, as the base wagering game and bonus game are mathematically independent of the portal trigger, game, or application. Similarly in accord with the present concepts, a cascade in a bonus game doesn't include a retriggering of a portal symbol, watermark, or the like (e.g., the watermark would stay displayed in association with the specified reel position).

In at least some aspects of the present concepts, the second array of portal symbols 125, or the like, are randomly generated and assigned to overlay a reel strip location, which could be a pre-determined location with respect to a designated symbol position or a randomly selected one of a plurality of pre-determined locations. Stated differently, the second array of portal symbols 125 is not mapped to predetermined reel locations, but are randomly generated and displayed in association with the displayed symbol positions comprising the base wagering game outcome. In one example, as each reel symbol 115 comes into view, the wagering game program, a separate portal program, or other gaming control system based instruction set would assign a random chance as to whether or not a portal symbol, watermark, or the like would be displayed in association with a symbol position (e.g., 1-in-2, 1-in-10, 1-in-a-1000, etc.) in the second array. In this example, unlike that depicted in FIGS. 4*a*-4*b*, the second "array" could include no portal symbols 125 at all, one portal symbol, or a plurality of portal symbols. These odds of the display of the portal symbols 125 in association with their respective symbol positions $\mathbf{112}_{x,y}$ are, again, mathematically independent from the odds by which symbols 115 are assigned to their respective symbol positions $\mathbf{110}_{x,y}$.

In an alternative aspect, particular symbol positions in the second array of portal symbols 125, groups of symbol positions in the second array of symbols, or the entire second array of symbols may be weighted to favor or disfavor, in relative terms, certain potential outcomes for the symbol position(s). By way of example, using FIGS. 4*a*-4*b* for illustration, symbol positions $\mathbf{120}_{2,1}$-$\mathbf{120}_{2,5}$ may have associated therewith a higher probability of being associated with portal symbols 125 that would trigger the portal bonus game or other portal game than the other symbol positions $\mathbf{120}_{1,1}$-$\mathbf{120}_{1,5}$ and/or $\mathbf{120}_{3,1}$-$\mathbf{120}_{3,5}$.

Alternatively, or in combination with the above-described or other aspects described herein, the depicted portal symbols 125 are presented in a bonus game, such as in a free-spin bonus. Thus, the portal symbols 125 may optionally trigger a portal game from a bonus game, rather than from a base wagering game. By way of example, the symbols shown in FIG. 4*a* could represent a first spin in a free-spin bonus game and FIG. 4*b* could represent a second spin in a free spin bonus game.

In some aspects, one or more portal symbol(s) 125 may be displayed in the portal symbol positions $\mathbf{120}_{x,y}$ prior to the reveal of one or more of the base wagering game symbols 115 (i.e., while the reels to which the base wagering game symbols are associated are spinning). In other aspects, if it is determined that a particular portal symbol or watermark is to be displayed in visual association with a symbol position, the portal symbol or watermark may be shown to spin as well, independently or together with the spinning of the base wagering game reels. The game program, wherever resident, controls the graphical integration of the depiction of the separate first array and second array, described in the example above. The execution of the symbol overlay, watermark, or the like can be graphically pre-rendered and stored in a physical memory of the gaming system or can alternatively be rendered on-the-fly.

In at least some aspects, the portal trigger comprising the portal symbol(s) 125 or alternatives thereto, such as watermarks or frames displayed in association with the reel symbol positions or other visual alteration of a reel symbol position or reel symbol, is normalized across different underlying wagering game platforms such that the mathematical model of the second array is independent of the array size. In other words, in such aspects it is desirable that the portal trigger can be applied across numerous different wagering game platforms having different array sizes. For example, in such cases the portal trigger that is overlaid over a 3×5 game, such as is represented in FIGS. 4*a*-4*b*, is statistically as likely to trigger as that overlaid over a 4×5 game. This normalization may be accomplished in various ways. In a first example, the portal symbols 125 are assigned to symbol positions $\mathbf{120}_{x,y}$ along a single reference line (e.g., visually corresponding to a typical default "payline"), such as along the middle row in FIGS. 4*a*-4*b*. Thus, the portal symbols 125 would be uniform, as between games utilizing a 3×5, a 4×5, or 5×5 array of symbol positions. In a second example, the portal symbols 125 are assigned to a specified array (e.g., 2×2, 2×3, 3×3) that would be overlaid of a corresponding plurality of symbol positions across different gaming platforms. Thus, a 2×2 array of portal symbols 125 could be displayed in games utilizing a 3×5, a 4×5, or 5×5 array of symbol positions, with the positioning of the portal symbol positions $\mathbf{120}_{x,y}$ being selected in accord with a unified strategy (e.g., the portal arrays in different game platforms utilizing a common origin) amongst the different wagering games.

In view of the various potential forms of presentment of the constituent elements of the portal trigger, such as the portal symbols 125 shown in FIGS. 4*a*-4*b*, there are different manners of satisfying a triggering condition. The triggering condition for the portal game may comprise a single portal symbol 125 in a predetermined portal symbol position, a single watermark disposed over a displayed symbol 115, a single background applied to a displayed symbol 115, a selected symbol 115 or symbols, in the base wagering game, or the like. The triggering condition may comprise, in other aspects, a plurality of portal symbols 125 (or base-wagering-game symbols 115) in predetermined symbol positions or in randomly determined portal symbol positions (or base-wagering-game-symbol positions), a plurality of watermarks disposed over a corresponding plurality of displayed symbols 115 or symbol positions $\mathbf{110}_{x,y}$, a background applied to a plurality of displayed symbols 115, or the like, etc.

The triggering condition for the portal game may, in yet other aspects, comprise a combination of disparate elements, such as a portal symbol 125 in at least one portal symbol position $\mathbf{120}_{x,y}$ and a watermark disposed over at least one symbol 115. Further, in any of the above aspects, or combinations thereof, the triggering of the portal game from the portal symbols may further be contingent upon limitations imposed on the position of the symbol positions. By way of example, the symbol positions $\mathbf{120}_{x,y}$ may be displayed and/or activated along only activated paylines in a base wagering game, along certain columns or rows of the reels, in a specified symbol position(s), and/or responsive to predetermined prerequisite condition associated with the portal trigger (e.g., minimum wager or side wagers associated with the portal trigger, membership in a casino club, historical performance, etc.).

In one aspect, the portal symbols 125 may only be activated when the symbol positions $\mathbf{120}_{x,y}$ are along an activated payline in a base wagering game and a winning outcome, a predetermined winning outcome, or a predetermined symbol or symbol combination of symbols 115, symbols 125, or a combination thereof occurs along that activated payline. Thus, although the portal trigger is mathematically independent of the base wagering game, an event in the base wagering game (or bonus game) could itself optionally serve to enable the portal trigger.

In yet other aspects, the portal trigger comprises a mystery trigger. A mystery trigger may be useful, for example, when it is desired to accommodate different game configurations (e.g., a 3×5 game and a 4×5 game), while both retaining a uniform portal game math model and avoiding any need to upload game specific information from the wagering game machine regarding the base wagering game or any associated game. The portal trigger may also vary between different gaming platforms. For example, one or more of the aforementioned portal triggers is employed for 3×5 wagering games, whereas a mystery trigger is used for other game configurations. For example, if the portal game is set up for application to 3×5 wagering games, but not 4×5 wagering games, if the configuration of an attached wagering game device is outside of the expected configuration, then the portal game controller(s) can make the portal trigger a mystery trigger for such wagering game device (e.g., for the 4×5 wagering game).

In at least some aspects, a wagering game machine (or server operatively associated therewith) communicates to the portal game application information on the math for the base wagering game conducted on the wagering game machine. For example, the base-wagering-game controller communicates to the portal game controller information relating to the base wagering game such as, but not limited to, any combination of number of reels, number of rows of symbols, bonus symbols (or other symbols), hit rate, frequency of bonus symbols (or other symbols), frequency of any symbol or symbols (or combination thereof), and/or frequency of the bonus itself so that the portal game controller can normalize the portal trigger across different wagering games. For example, once the wagering game machine (or server or controller operatively associated therewith) pushes up information to the portal game controller about the base wagering game math, the portal game controller is then able to select, as a portal trigger, symbols 115 or symbol combinations in a base wagering game to use as a trigger for the portal game, wherein the frequency of the portal trigger for a variety of different wagering games may then be equalized or at least substantially equalized. Thus, no matter what the frequency of a symbol or symbol combination for a particular wagering game (e.g., a bonus trigger), among a variety of different wagering games that can be connected with a portal game, one or more symbol positions 115 in the game (e.g., a different number of frames for different types of wagering games) may be selected to provide a uniform frequency of triggering the portal game from each of the types of wagering games. For example, in wagering games that have a frequent bonus, there are fewer boxes, frames, watermarks, or portal symbols, or the like, whereas in wagering games that have an infrequent bonus, the wagering game would present the player with comparatively more boxes, frames, watermarks, or portal symbols, or the like. In the end, the frequency of triggering the portal game would be the same in both wagering games, even though one wagering game triggers the base-game bonus more frequently than the other wagering game. The portal trigger may, for example, comport with the base-wagering-game bonus-trigger symbols. However, it is generally desired to provide a portal trigger that is different from the bonus trigger of such base wagering games so as to avoid hitting both the base wagering game bonus game and the portal game at the same time.

In one example, where the portal trigger is associated with symbols in the base wagering game that are communicated to the portal game application, frames around randomly determined symbol positions are configured to flash on and off as the reels spin. Symbols that are shown while the frame around the symbol is on or highlighted would then be utilized to determine whether or not a portal trigger condition is satisfied. Alternatively, in yet another example, the portal trigger could comprise merely the symbol positions of the base wagering game, with frames around the symbol positions randomly being highlighted contemporaneously with the spinning of the reels and/or reveal of the reel or wagering game outcome(s). If a particular number of frames are highlighted, which could differ for wagering games having different numbers of symbol positions, or a particular pattern of symbol positions are highlighted, the portal trigger is satisfied (i.e., completely independent of any symbols presented in the base wagering game outcome). In this latter example, the portal trigger may be readily understood to comprise a game on top of another game wherein the portal trigger is not built into the underlying game, but is rather overlaid thereover and is mathematically independent of the underlying game.

A portal game in accord with at least some aspects of the present concepts comprises a math model that may be overlaid over a plurality of different wagering games having a plurality of different math models. For example, the present concepts include a method for conducting a portal game across a plurality of wagering game devices 10 conducting a plurality of wagering games, at least some of the plurality of wagering games having different math models, the method comprising the acts of using one or more processors 34 operatively associated with the wagering game devices, conducting a first wagering game in accord with a first math model and conducting a second wagering game in accord with a second math model and, using the one or more processors 34 operatively associated with the wagering game devices or a separate portal game controller operatively associated with both the portal game and the wagering game devices, overlaying a portal game over each of the first wagering game and the second wagering game, the portal game comprising a third math model that is mathematically independent from the first math model and the second math model.

As an illustration of at least some of the above-described concepts, a first bank of wagering game machines conducting a first wagering game utilizing a 3×5 array of symbol positions presented on a video display (e.g., SILVER SWORD® manufactured by WMS Gaming Inc. of Waukegan, Ill.) and a second bank of wagering game machines conducting a second wagering game (e.g., MOON RISING® manufactured by WMS Gaming Inc. of Waukegan, Ill.), also utilizing a 3×5 array of symbol positions presented on a video display, are provided wherein the first wagering game is different from the second wagering game and the math model of the first wagering game is different from the math model of the second wagering game. The controller(s) for the wagering game machines in the first bank of wagering game machines and the controller(s) for the wagering game machines in the second bank of wagering game machines respectively pass to the controller(s) for the portal game basic information about the array sizes of the base wagering games conducted via the respective controllers. In this case, the portal game controller (s), in view of the commonality in arrays between the different wagering games in the first bank of wagering game machines and the second bank of wagering game machines, can implement the portal game in the same way across the different wagering games at the different banks. Even though the different wagering games utilize different math models, the portal game is the same and it is completely independent from those two math models.

In another illustration of at least some of the above-described concepts, a first bank of wagering game machines conducting a first wagering game utilizing a 3×5 array of symbol positions presented on a video display and a second bank of wagering game machines conducting a second wagering game utilizes a 4×5 array (or "5×4" array) of symbol positions presented on a video display (e.g., LANCELOT® manufactured by WMS Gaming Inc. of Waukegan, Ill.), wherein the first wagering game is different from the second wagering game and the math model of the first wagering game is different from the math model of the second wagering game. The controller(s) for the wagering game machines in the first bank of wagering game machines and the controller(s) for the wagering game machines in the second bank of wagering game machines respectively pass to the controller(s) for the portal game basic information about the array sizes of the base wagering games conducted via the respective controllers. In this case, the portal game controller (s), in view of the differently-sized arrays as to between the first bank of wagering game machines and the second bank of wagering game machines, implements the portal game utilizing the entire 3×5 array in the first bank of wagering game machines and a 3×5 sub-portion of the 4×5 array in the second bank of wagering game machines. Alternatively, the portal game controller(s) could utilize an equivalent sub-portion (e.g., a 1×5 array) of each of the two different wagering games. In yet another alternative, the portal game controller (s) could select, based on math model information provided as to each of the first and the second wagering games, a first symbol or first symbol combination in the first wagering game that had an equal, or at least substantially equal probability of occurrence as a second symbol or first second symbol combination in the second wagering game. Again, in each of these examples, the portal game is independent from the math models of both of the first wagering game and the second wagering game.

In at least some aspects, to facilitate both uniformity of presentment of the portal game influence into a variety of base different wagering games, the graphics (e.g., symbol graphic, symbol background graphic, etc.) in the base wagering games may be pre-rendered or pre-stored with a first configuration corresponding to the base wagering game and a second configuration corresponding to the portal trigger. By way of example, across a variety of different wagering games, a portal trigger graphic may comprise a particular symbol with a watermark or a particular symbol background of a predetermined unique color for the wagering game (e.g., gold backlight, white backlight, etc.). The base wagering game controller may also render-on-the-fly the portal trigger graphics for a randomly determined symbol or symbols in lieu of accessing the pre-rendered or pre-stored graphics.

In still other aspects, a portal trigger may comprise an accumulator that accumulates portal symbol triggers, which can be different for different wagering games, with a sufficient number of such portal symbol triggers being required to trigger the portal game. By way of example, in five different wagering games, a portal trigger comprises a watermark that is superimposed on a randomly determined symbol. At each wagering game machine, regardless of the underlying base wagering game and optional bonus game associated therewith, each watermark imposed on the base wagering game by the portal game controller(s) is accumulated in a memory. To illustrate, in each of the five different wagering games conducted on a plurality of gaming machines, each play of a wagering game has a uniform chance (e.g., 1-in-100, 1-in-1000, etc.) of a portal symbol or watermark or the like appearing in association with a base wagering game outcome, following satisfaction of any enabling criteria that may be required for the display or generation of, or realization of, a portal symbol or the like. As each portal symbol or watermark or the like is displayed, an accumulator associated with that wagering game machine or player tracking number is incremented and, upon accumulation of a predetermined number of the watermarks, the portal game is then triggered. In one possible implementation, by way of example, prior to display of any portal symbol(s) or watermark(s) or the like, one or more frames are randomly overlaid over a corresponding number of symbol positions or portal symbol positions at the beginning of a spin in the base wagering game and the frame would "catch" portal symbol(s) or watermark(s) or the like. The number of frames may advantageously be selectively varied among different types of wagering games (e.g., 3×5 wagering game, 4×5 wagering game, etc.) to normalize the frequency of portal game triggering therebetween.

Figure 6A:
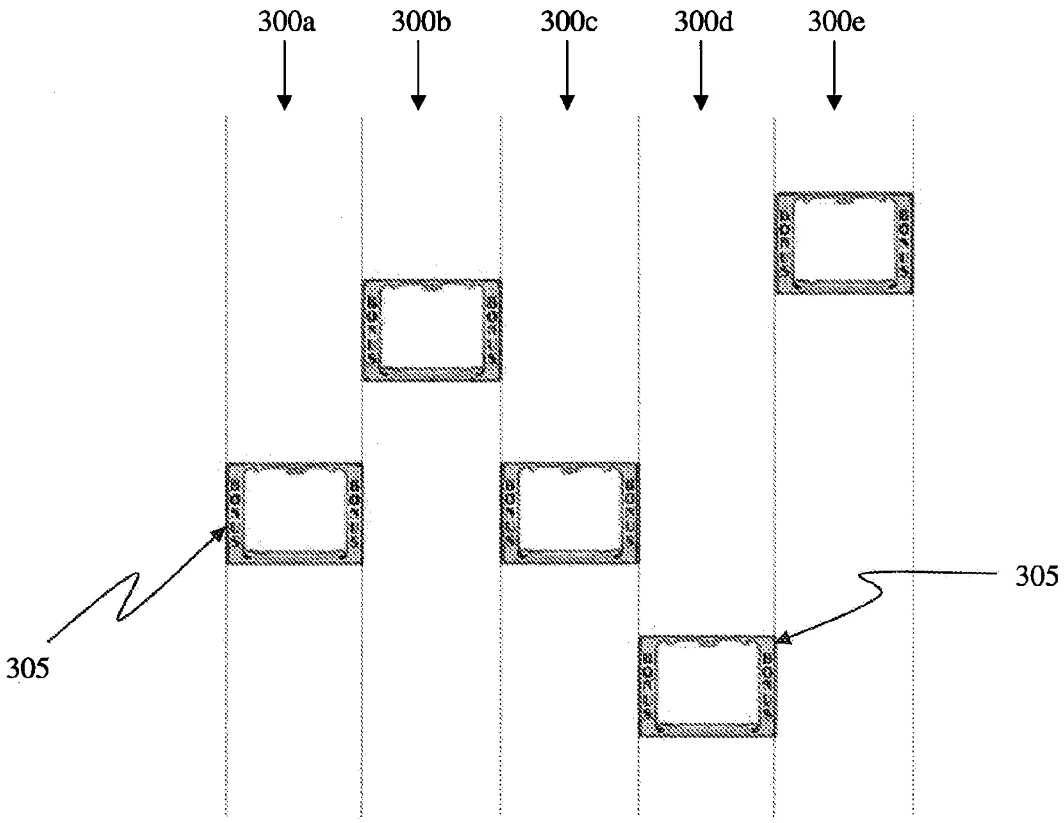
FIGS. 6*a*-6*b* are depictions of an example of at least one aspect of yet another embodiment according to the present concepts.
Figure 6B:
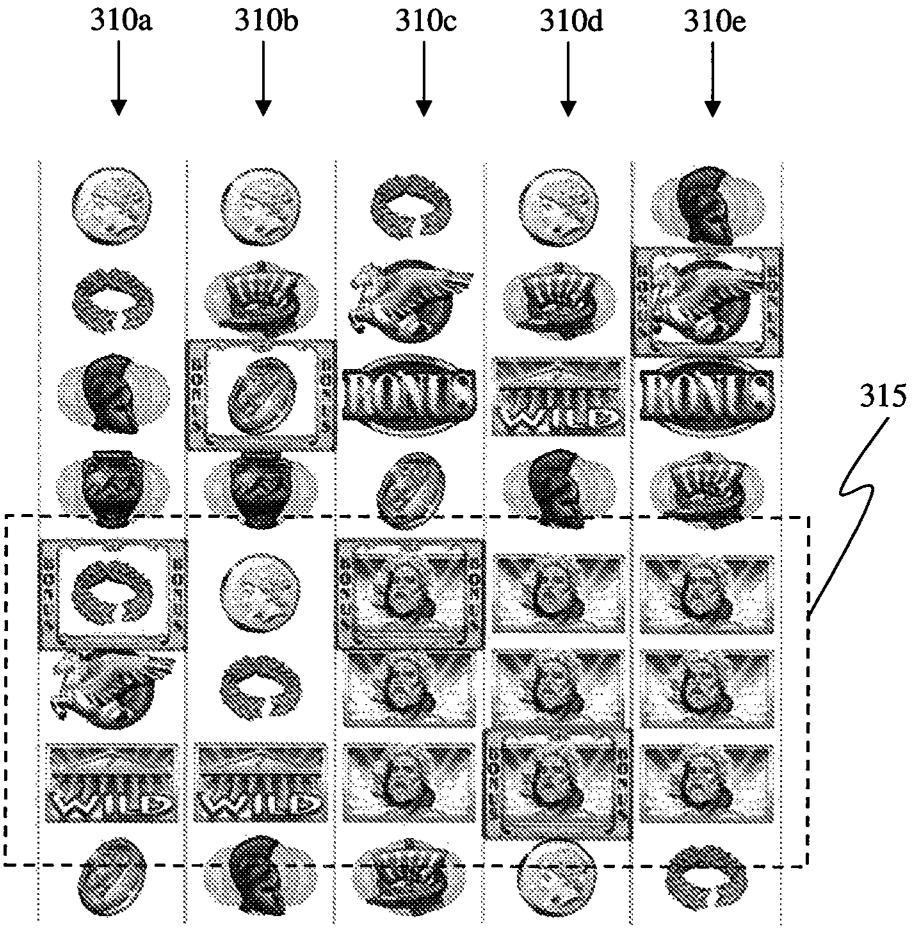

As noted above, in some aspects of the present concepts, a wagering game machine (or server operatively associated therewith) communicates to the portal game controller information on the math for the base wagering game conducted on the wagering game machine including any of or combination of a number of reels, a number of rows of symbols, bonus symbol(s), symbol(s), hit rate, frequency of bonus symbols or other symbols, frequency of any symbol or symbols (or combination thereof), and/or frequency of the bonus. FIGS. 6*a*-6*b* show one example where a portal game trigger is enabled for a wagering game having five reels corresponding to reel strips 310*a*-310*e* partially shown in FIG. 6*b*. FIG. 6*a* shows a plurality of portal symbol reel strips 300*a*-300*e* having individual portal symbol position frames defined thereby. In FIG. 6*a*, particular portal symbol positions in the portal symbol reel strips 300*a*-300*e* are indicated by a frame 305. FIG. 6*b* shows a situation where, following enablement of the portal game trigger, the portal symbol reel strips 300*a*-300*e* are overlaid over (or under) the wagering game reel strips 310*a*-310*e* so that the symbol positions in the portal symbol reel strips 300*a*-300*e* and the wagering game reel strips 310*a*-310*e* are appropriately aligned. In this example, the symbols that are shown in the respective frames 305 of the portal symbol reel strips 300*a*-300*e* are then used to determine whether or not the portal game is triggered. As shown in FIG. 6*b*, the frames 305 are shown to correspond to reel strip symbols of a LAUREL, SILVER CON, ZEUS, ZEUS, and PEGASUS. Purely by way of example, an actual depiction on a wagering game device (e.g., a 3×5 array) would show only a portion of the depicted portion of the reel strips 310*a*-310*e* and portal symbol reel strips 300*a*-300*e*, such as is represented by the window 315.

Relating to the example of FIGS. 6*a*-6*b*, it is possible that the portal game may be mapped to be triggered off of a particular symbol, a particular combination of symbols, and/or a particular number of symbols without regard to the actual symbol(s) that are shown in relation to the frames 305. In the situation where the portal game is triggered off of a particular symbol or a particular combination of symbols, based on information on the base wagering game (e.g., frequency of occurrence of each of the symbol(s) or combinations) that is communicated to the portal game controller, or the like, the overall mathematical independence of the portal game math model and the wagering game math model may still be retained even though a selected frequency of appearance of a symbol is utilized in the triggering of a portal game. For example, using a hypothetical example, if a frequency of appearance of a particular symbol on a particular reel and symbol position in the base wagering game is 0.075 and the portal game math model utilizes a random event of that frequency in combination with the frequency of the frame 305 occurring on the same reel and symbol position (e.g., 0.25), then the frequency of the overlapping of the frame with that symbol on the particular reel and symbol position would be 0.01875. Such combination of the portal game frame 305 and the appearance of a designated base wagering game symbol could be used in various manners, such as a trigger for a portal game or as an award event with associated winnings in accord with the portal game math model.

Although information about the base wagering game math model (i.e., the frequency of the symbol) is utilized by the portal game, the math model of the portal game is still independent of the math model of the base wagering game, such that the frequency of triggering the portal game remains constant across all base wagering games. The expected value of a random variable is the sum of the probability of each possible outcome of the wagering game multiplied by the payoff. The math model of the base wagering game represents, in effect, a sum total of probabilities of occurrence of different outcomes that are eventually realized after a sufficiently long period of time. The outcomes or triggers associated with the portal game are not related to the expected value of the base wagering game or associated games and are, therefore, independent of the base wagering game.

In some aspects, the math model of the portal game or the like may comprise an event (e.g., an occurrence of a specified symbol in a specified location, an occurrence of a plurality of symbols in a trigger or an outcome) associated with a specified value (e.g., 0.075 in the example above) or a predetermined narrow ranges of acceptable values (e.g., 0.074-0.076) for the frequency of occurrence of the event. Information on the frequency of occurrence of events in base wagering games on which a portal game is overlaid may then be passed up to the portal game controller and the portal game controller then selects those events having the requisite value or falling within the predetermined narrow range of acceptable values for selective association with the portal application. The math model is thus that of the portal game, but the particular graphics and events associated with the portal game are borrowed from the base wagering game. In this manner, the portal game controller may scan the various base wagering games over which the portal game is overlaid to develop, using base wagering game information, a combination of base wagering game events that comports with the math model of the portal game. In the event that certain aspects of the portal game math are not appropriately satisfied by the available events in the base wagering game, then a mystery trigger may be employed.

In other aspects of the above concepts, a player may optionally be permitted to pay (e.g., wager, side wager, etc.) for each frame 305 to enhance the player's odds of achieving entry into a portal game, or to enhance the player's odds of achieving a winning outcome in a portal game.

In another aspect of the above concepts, a certain confluence of reel strips 310*a*-310*e* and portal symbol reel strips 300*a*-300*e*, such as the PEGASUS having a frame associated therewith, as shown in FIG. 6*b*, may itself trigger the occurrence of one or more additional frames 305 in association with the displayed array of base wagering game symbols or in one or more subsequent plays of the base wagering game. For example, the player may receive, over the next ten plays, an additional frame 305, thereby enhancing the players odds of a beneficial outcome tied to the portal game.

In other aspects, the present concepts broadly include any wagering game that is superimposed over another wagering game, wherein the two wagering games are mathematically independent.

Each of these embodiments and obvious variations thereof is contemplated as falling within the spirit and scope of the claimed invention, which is set forth at least in part in the following claims.

What is claimed is:

1. A method for enabling a portal game across a plurality of wagering game devices conducting a plurality of wagering games, at least some of the plurality of wagering games having different math models, the method comprising the acts of:

using one or more processors operatively associated with the wagering game devices, conducting a first wagering game on a first wagering game device in accord with a first math model and conducting a second wagering game on a second wagering game device in accord with a second math model; and using a portal game controller, which may be the one or more processors operatively associated with the wagering game devices or a separate controller, operatively associated with both the portal game and the first and second wagering game devices, overlaying the portal game over each of the first wagering game and the second wagering game, the portal game comprising a third math model that is mathematically independent from the first math model and the second math model.

2. The method of claim 1, wherein the first wagering game comprises a reel-based wagering game displaying wagering game outcomes in a 3×5 array.

3. The method of claim 2, wherein the second wagering game comprises a reel-based wagering game displaying wagering game outcomes in a 4×5 array.

4. The method of claim 1, wherein both the first wagering game and the second wagering game comprise a reel-based wagering game displaying wagering outcomes in an array having an equal number of displayed elements in a wagering game outcome.

5. The method of claim 1, wherein the portal game comprises the generation and display of at least one symbol, sub-symbol, watermark, light or backlight, in accord with the third math model, in visual association with a symbol in the first wagering game and the generation and display of at least one symbol, sub-symbol, watermark, light or backlight, in accord with the third math model, in visual association with a symbol in the second wagering game.

6. The method of claim 1, wherein the portal game comprises the generation and display of a symbol, sub-symbol, watermark, light or backlight, in accord with the third math model, in visual association with a symbol in the first wagering game and the generation and display of a plurality of symbols, sub-symbols, watermarks, lights or backlights, or combinations thereof in accord with the third math model, in visual association with a plurality of symbols in the second wagering game.

7. The method of claim 5, wherein the portal-game symbols, sub-symbols, or watermarks are displayed over or under the corresponding wagering game symbols to which such portal game symbols, sub-symbols, or watermarks are associated.

8. The method of claim 5, wherein the portal-game symbols, sub-symbols, or watermarks are displayed adjacent the corresponding wagering game symbols to which such portal-game symbols, sub-symbols, or watermarks are associated.

9. The method of claim 5, wherein the portal-game symbol, sub-symbol, watermark, light or backlight, is utilized to determine if a portal-game trigger condition has been satisfied on at least one of the wagering-game device or the second wagering-game device.

10. The method of claim 5, wherein the portal-game symbol, sub-symbol, watermark, light or backlight, is utilized to determine if a randomly selected portal-game winning outcome has been achieved on at least one of the wagering-game device or the second wagering-game device.

11. A wagering game system configured to independently and simultaneously conduct a wagering game and a portal game on at least one wagering game device, the wagering game system comprising at least one wagering game device comprising a display device;

at least one controller in communication with the display device, the at least one controller being operative to execute instructions borne by a physical storage medium, the instructions causing the at least one controller to perform the acts of:

conducting a wagering game on the wagering game device in accord with a first math model;

overlaying a portal game over the wagering game, the portal game comprising a second math model that is mathematically independent from the first math model of the wagering game; and determining an outcome for the wagering game and the portal game, the outcome being simultaneously displayed on the display device.

12. The wagering game system of claim 11, wherein the portal game controller is configured to generate and display at least one symbol, sub-symbol, watermark, light or backlight, in accord with the second math model, in visual association with a symbol in the wagering game.

13. The wagering game system of claim 12, wherein the portal-game controller is configured to display the at least one portal-game symbols, sub-symbols, or watermarks over, under, or adjacent the corresponding wagering-game symbols to which such portal-game symbols, sub-symbols, or watermarks are associated.

14. The wagering game system of claim 12, wherein the portal-game controller is configured to utilize the at least one displayed portal-game symbol, sub-symbol, watermark, light or backlight, to determine if a portal-game trigger condition has been satisfied on the wagering-game device or to determine if a randomly selected portal-game winning outcome has been achieved on the wagering-game device.

15. A portal game enabled gaming system for enabling a portal game across a plurality of wagering game devices conducting a plurality of wagering games, at least some of the plurality of wagering games having different math models, the system comprising:

a first wagering game device configured to conduct a first wagering game, in accord with a first math model, using one or more processors operatively associated with the first wagering game;

a second wagering game device configured to conduct a second wagering game, in accord with a second math model, using one or more processors operatively associated with the second wagering game; and a portal game controller, which may be the one or more processors operatively associated with the first or second wagering game devices or a separate controller, operatively associated with both the portal game and the first and second wagering game devices, overlaying the portal game over each of the first wagering game and the second wagering game, the portal game comprising a third math model that is mathematically independent from the first math model and the second math model.

16. The portal game enabled gaming system according to claim 15, wherein the first wagering game comprises a reel-based wagering game displaying wagering game outcomes in a 3×5 array.

17. The portal game enabled gaming system according to claim 16, wherein the second wagering game comprises a reel-based wagering game displaying wagering game outcomes in a 4×5 array.

18. The portal game enabled gaming system according to claim 15, wherein both the first wagering game and the second wagering game comprise a reel-based wagering game displaying wagering outcomes in an array having an equal number of displayed elements in a wagering game outcome.

19. The portal game enabled gaming system according to claim 15, wherein the portal game is configured to generate and display, on a display device of the first wagering game device, at least one symbol, sub-symbol, watermark, light or backlight, in accord with the third math model, in visual association with a symbol in the first wagering game; and wherein the portal game is configured to generate and display, on a display device of the second wagering game device, at least one symbol, sub-symbol, watermark, light or backlight, in accord with the third math model, in visual association with a symbol in the second wagering game.

20. The portal game enabled gaming system according to claim 15, wherein the portal game is configured to generate and display, on a display device of the first wagering game device, at least one symbol, sub-symbol, watermark, light or backlight, in accord with the third math model, in visual association with one or more symbols in the first wagering game; and wherein the portal game is configured to generate and display, on a display device of the second wagering game device, at least one symbol, sub-symbol, watermark, light or backlight, in accord with the third math model, in visual association with one or more symbols in the second wagering game.

* * * * *